UNITED STATES PATENT OFFICE.

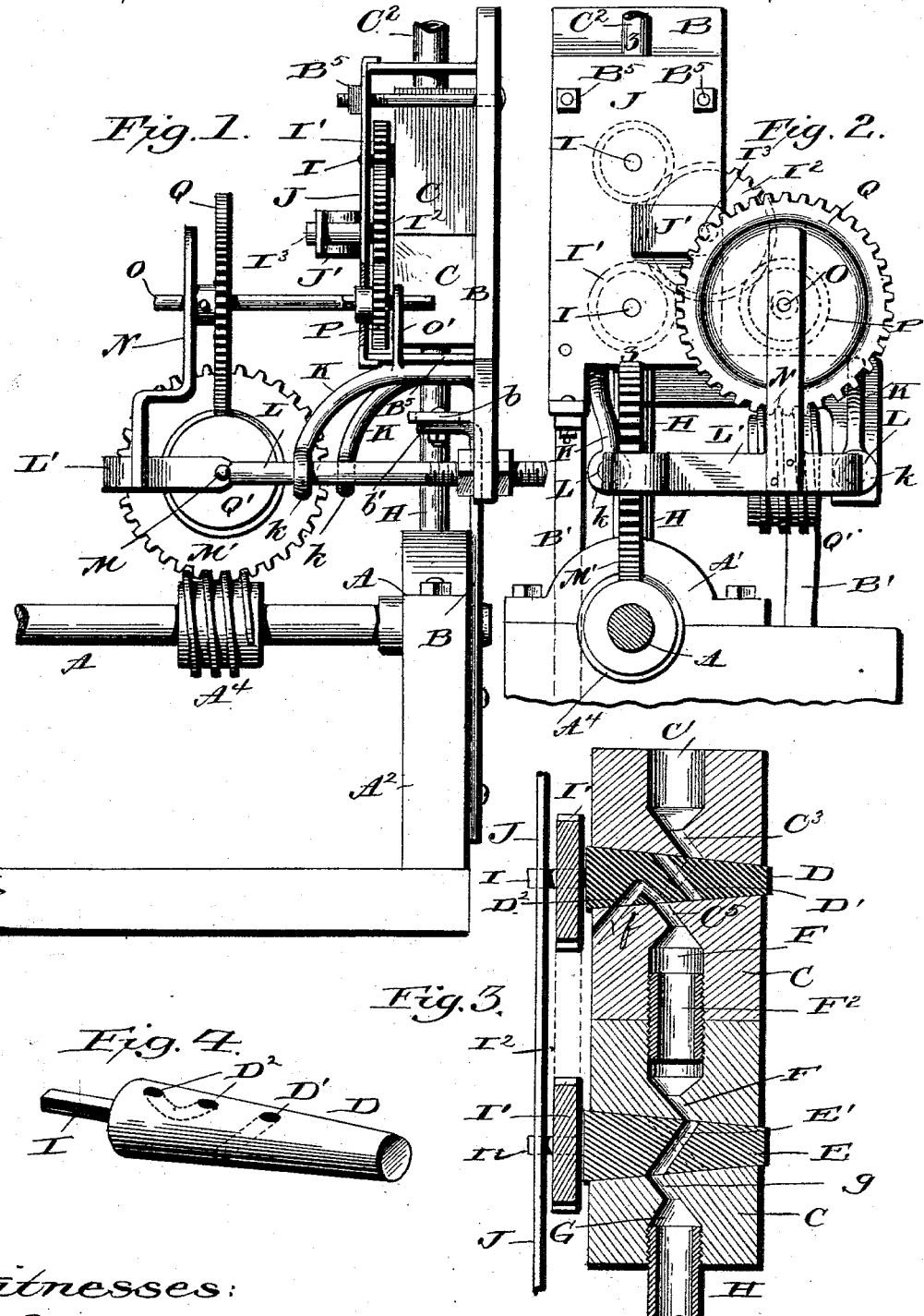

FREDERICK A. MITCHELL, OF MITCHELL, INDIANA.

LUBRICATOR.

SPECIFICATION forming part of Letters Patent No. 552,851, dated January 7, 1896.

Application filed February 28, 1895. Serial No. 540,045. (No model.)

*To all whom it may concern:*

Be it known that I, FREDERICK A. MITCHELL, a citizen of the United States, residing at Mitchell, in the county of Lawrence, State of Indiana, have invented certain new and useful Improvements in Lubricators, of which the following is a specification, reference being had therein to the accompanying drawings.

This invention relates to certain new and useful improvements in lubricators of that class adapted to be operated by connection with the rotating shaft of the machine; and it has for its objects, among others, to provide a simple and cheap device of this character readily mounted in position and adjustable to accommodate it to the varying conditions under which it may be desired to set it, and having a novel construction and arrangement of valves geared together to be simultaneously actuated, the one to be open when the other is closed. One of the valves is provided with an inclined passage therethrough, and also with a substantially V-shaped passage for the purpose of providing a vent when the said valve is in position to shut off the supply of lubricant and the other valve is open.

Other objects and advantages of the invention will hereinafter appear and the novel features thereof will be specifically defined by the appended claims.

The invention in this instance resides in the peculiar combinations, and the construction and arrangement of parts, all as more fully hereinafter described, shown in the drawings and then particularly pointed out in the claims.

The invention is clearly illustrated in the accompanying drawings, which, with the letters of reference marked thereon, form a part of this specification, and in which—

Figure 1 is a side elevation of my improved lubricator in operative position. Fig. 2 is a view at right angles to Fig. 1 with the rotary shaft in cross-section. Fig. 3 is an enlarged vertical section through the valves and their support and gears on the line 3 3 of Fig. 2. Fig. 4 is a perspective view of one of the valves removed from its support.

Like letters of reference indicate like parts throughout the several views.

Referring now to the details of the drawings by letter, A designates the shaft to whose bearing it is desired to conduct the lubricant. This shaft is mounted in a suitable bearing A' on the upright portion $A^2$ of the machine and upon this shaft is the worm $A^4$. From this worm is conveyed the motion that actuates the valves and controls the flow of the lubricant. The lubricator and its actuating mechanism, aside from this worm, are designed to be mounted upon the machine or in proximity thereto in any suitable manner. As shown in this instance the plate or frame B which supports the various parts is provided with a lateral lug or extension $b$, (see Fig. 1,) which is provided with a longitudinal slot, as indicated in dotted lines in Fig. 1, and to which is adjustably secured, as by a bolt and nut, as shown, the lateral portion $b'$ of the upright B', which latter is designed to be secured in any suitable manner to the upright $A^2$ or to any other fixed part. More than one of these uprights B' may be provided when required. Two are shown in Fig. 2. This lateral adjustment permits of adjustment of the lubricator to accommodate it to the varying circumstances under which it may be required to affix it.

The plate or frame B has mounted thereon the block C, having transverse tapered openings forming bearings for the horizontally-disposed valves D and E. This block may be in two parts, if desired, as shown in Figs. 1 and 3, to facilitate the formation of the chambers therein. This block has at its upper end a chamber or cavity C', with which communicates the supply-pipe $C^2$, which may be connected with any suitable source of supply of lubricant. From the lower end of this cavity or chamber extends an inclined discharge opening or passage $C^3$, as seen in Fig. 3. This passage extends to the wall of the opening in which the valve D is fitted to rotate. This valve has an inclined passage transversely through it, as seen in Figs. 3 and 4, said passage D' being designed to register with the passage $C^3$ when the valve is turned in proper position, as indicated by dotted lines in Fig. 3. This valve has also upon one side the substantially V-shaped passage $D^2$, both ends or openings of which are upon the same side of the valve, as shown, and this passage is designed to form a vent from the second or intermediate chamber F of the block C when the valve D is so turned as to shut off the supply to said chamber from the camber C', as indicated in Fig. 3. The block C is provided with an inclined passage C⁵, as seen in Fig. 3, with which this passage D² registers to afford communication with the open air, as seen in Fig. 3. An inclined passage ƒ from the upper end of the chamber F communicates with the other branch of the passage D² when the valve is turned in the proper position, as is also shown in said Fig. 3. The valve E has a single inclined passage E' extending transversely therethrough, as seen in Fig. 3, and when the valve is in one position this passage is designed to afford communication between the inclined passage F' from the bottom of the intermediate chamber F and the inclined passage g at the upper end of the chamber G at the lower portion of the block, and with which communicates the outlet-pipe H, preferably screwed into the block C and leading to the journal to be lubricated, as seen best in Figs. 1 and 2. An exteriorly-threaded tube F² is screwed into and joins the two parts of the block C, as seen in Fig. 3, to constitute the intermediate chamber and to prevent possibility of leakage at this point.

Each of the valves D and E has a rectangular shaft or extension I, upon which is fast a gear-wheel I' meshing with an intermediate larger gear I² on a stub-shaft I³ supported in the plate J, and an arm J' extending therefrom, as seen in Figs. 1 and 2, the said plate J being supported from the frame or plate B in any suitable manner—as, for instance, by the bolts B⁵, as seen in Figs. 1 and 2. The outer ends of the shafts of the valves are mounted in the plate J.

The valves are actuated as follows: Projecting from the frame or plate B below the block C are the arms K, which are curved downward and at their lower ends are provided with loops or eyes k, through which pass and by which are supported the bolts L, which support the substantially U-shaped piece or yoke L', in which is journaled a shaft M, upon which is fast a large worm-wheel M', which meshes with the worm A⁴ on the shaft A. Rising from this yoke is an upright N, in which is journaled one end of the shaft O, the opposite end of which is supported in the vertical arm O' rising from one of the curved arms K, as seen in Fig. 1, and upon this shaft is a small gear P meshing with the large gear I², as seen best in Fig. 2, and upon this same shaft is fast a worm-wheel Q meshing with the worm Q' on the shaft M, all as seen clearly in Figs. 1 and 2.

The bolts L are adjustable lengthwise in their bearings by means of the nuts L³, so that the worm Q' and worm-wheel M' may be properly set to suit the position of the worm on the shaft A or to suit other conditions under which it may be necessary to mount the device.

With the parts constructed and arranged substantially as above set forth the operation is as follows: The valves D and E are so set that when one is open the other is closed, so that when the lubricant is flowing from the central chamber F its discharge from the chamber C' is cut off, and vice versa; and when this condition of things occurs the valve D is in such position that the vent from the chamber F is open, as shown by full lines in Fig. 3. The rotation of the shaft A actuates the valves through the medium of the worms and gears above described, the valves being designed to be rotated slowly in their bearings and the flow of lubricant to the central chamber and from the same thus controlled.

Modifications in detail may be resorted to without departing from the spirit of the invention or sacrificing any of its advantages.

Other forms of mechanism may be provided for actuating the valves.

What is claimed as new is—

1. In a lubricator a block having two end chambers and inlet and outlet connections therewith and a central chamber with inclined passages therefrom, means for supplying a lubricant to said block, combined with two independent rotary valves mounted in said block and each having a passage therethrough adapted to register with said inclined passages upon opposite sides of the central chamber and one of said valves also having a substantially V shaped passage to form a vent from the central chamber to the exterior of the block, substantially as described.

2. The combination with two independently rotatable valves having inclined passages therein, one of which has a substantially V shaped passage to form a vent from the central chamber to the exterior of the block in which it is mounted, of a block in which said valves are mounted provided with three chambers with inclined passages adapted to register with the inclined passages in said valves, the end chambers having inlet and outlet connections, means for supplying a lubricant to the block, a gear on the shaft of each valve and connections between the shaft to the lubricator and said gears, substantially as described.

3. The combination with the frame and its curved arms with eyes, of the bolts supported in the said eyes and adjustably connected with the frame, the yoke supported on said bolts, the shaft with its worm wheel and worm mounted in said yoke, the block with its chambers and passages, the valves mounted for rotation in said block, means for supplying a lubricant to said block, and operative connections between the valves and the said worm, substantially as described.

4. The combination with the frame and its attaching means, of the block with its independent valves and chambers with inclined passages and communicating with each other, means for supplying oil to the block, the curved arms with eyes, the gears on the shafts of the valves, the adjustable bolts passed through said eyes, the yoke carried by said bolts, the shaft with its worm, the shaft at right angles thereto, the worm and worm wheel on said shaft and intermediate connections between the same and the gears on the shafts of the valves, substantially as described.

In testimony whereof I affix my signature in presence of two witnesses.

FREDERICK A. MITCHELL.

Witnesses:
FREDRICK MOORE,
LON BEASLEY.